United States Patent [19]

Bennion

[11] Patent Number: 5,634,123
[45] Date of Patent: May 27, 1997

[54] DATA MANAGEMENT USING NESTED RECORDS AND CODE POINTS

[75] Inventor: H. Richard Bennion, South Jordan, Utah

[73] Assignee: Park City Group, Inc., Park City, Utah

[21] Appl. No.: 88,788

[22] Filed: Jul. 8, 1993

[51] Int. Cl.$^6$ ..................................................... G06F 17/30
[52] U.S. Cl. .................. 395/611; 395/601; 395/612; 395/200.03; 364/255.2; 364/283.2; 364/DIG. 1
[58] Field of Search ...................................... 395/600, 700, 395/650; 360/48

[56] References Cited

U.S. PATENT DOCUMENTS

| | | | |
|---|---|---|---|
| 5,034,914 | 7/1991 | Osterlund | 395/425 |
| 5,129,084 | 7/1992 | Kelly, Jr. et al. | 395/650 |
| 5,200,864 | 4/1993 | Dunn et al. | 360/48 |
| 5,355,493 | 10/1994 | Silberbauer et al. | 395/700 |
| 5,432,928 | 7/1995 | Sherman | 395/600 |
| 5,463,724 | 10/1995 | Anderson et al. | 395/148 |

OTHER PUBLICATIONS

Tanenbaum, Andrew S., Operating Systems:Design and Implementation, 1987, pp. 251–273.
Hanson, Owen, Design of Computer Data Files, 1982, pp. 1–18, 48–62.

Primary Examiner—Thomas G. Black
Assistant Examiner—Hosain T. Alam
Attorney, Agent, or Firm—Fenwick & West LLP

[57] ABSTRACT

A data management system and method for storing and communicating different types of data allow variable lengths and hierarchical nesting of data records. Hierarchical structure is implicitly defined by relationships of length fields of data records. The system and method use data-containing records to store data and container records to contain other records in order to define the hierarchical structure and thereby greatly facilitate the movement and management of the stored data.

14 Claims, 8 Drawing Sheets

DATA MANAGEMENT USING NESTED RECORDS AND CODE POINTS

BACKGROUND OF THE INVENTION

1. Field of the Invention

This invention relates to distributed data management and, more particularly, to a persistent index storage system and method allowing storage and manipulation of data using hierarchical nested records and code points.

2. Description of the Related Art

Conventional distributed processor systems facilitate execution of several different processes simultaneously on different processors. Systems and methods for exchanging data among these processors exist in the prior art (see U.S. Pat. No. 5,056,003 to Hammer et al. for Distributed Data Management Mechanism). Such systems and methods present techniques for reducing storage requirements by splitting a logical data stream into segments residing at different processor storage locations. Descriptor elements indicate the location and length of the various segments so that they can be reassembled into the complete logical data string.

Hammer et al. and related techniques suffer from several disadvantages. One disadvantage is that hierarchical data structures are not generally supported; if the data stream contains nested records, there is no built-in technique for navigating through the data structure. Thus, individual applications are required to deal with the hierarchical structure, as they cannot rely on the data management system to do so. This adds to programming overhead. Another disadvantage is that logical data strings have a fixed maximum length due to the fixed and limited space available for the descriptor element specifying length. Finally, existing systems generally provide only a mechanism for communicating and passing data strings among processors, but do not provide a persistent storage system.

SUMMARY OF THE INVENTION

In accordance with the present invention, there is provided a system and method of data management permitting storage and communication of different types of data, and allowing hierarchical nesting of data records and variable lengths of records. Hierarchical structure is implicitly defined by relationships of length fields of data records. Thus, movement and management of data stored according to the structure of the present invention is greatly facilitated. Individual applications are not required to deal with navigation through the hierarchical structure, since the data management system does so automatically. In addition, the data structure provides for movement of "chunks" of records that have a hierarchical relationship with one another. Finally, the system of the present invention includes format information to facilitate data transfers between applications employing different data formats.

The data structure defined by the present invention includes two types of records: data-containing records and container records. Data-containing records contain data, while container records contain other records. A code point found at the beginning of each record specifies its type. A length field facilitates variable data lengths for data-containing records, as well as implicit definition of a hierarchical structure among records. A format field facilitates movement of data among environments having differing data formats. Code point definitions may be system-wide, or application-specific, depending on the level of the particular record in the overall hierarchy.

In defining the hierarchical relationship among records implicitly by virtue of the various length fields, the data structure provides the above-recited advantages without requiring large amounts of data storage.

BRIEF DESCRIPTION OF THE DRAWINGS

FIG. 3 is a diagram of a sample string of data bytes according to the preferred embodiment.

DESCRIPTION OF THE PREFERRED EMBODIMENT

Figure 1:
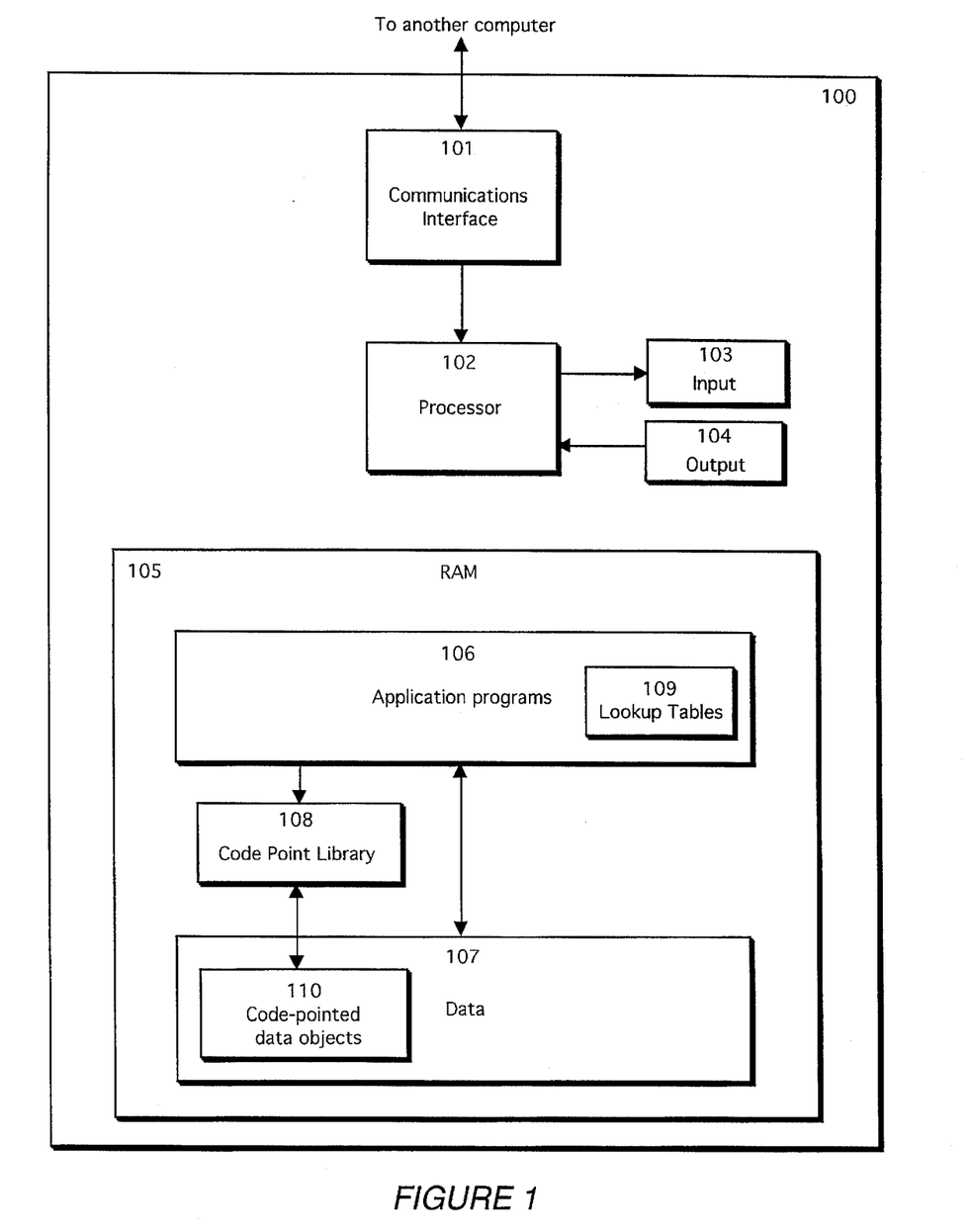
FIG. 1 is a block diagram of a preferred hardware environment for the present invention.

Referring now to FIG. 1, there is shown a block diagram of a preferred hardware environment for the present invention. In the preferred embodiment, computer 100 may be a conventional IBM-compatible personal computer including standard communication interface hardware 101, Intel processor 102, input device 103 such as keyboard and/or mouse, output device 104 such as display screen and/or printer, and random access memory (RAM) 105. RAM 105 is divided into several sections, each of which will be described below.

Application programs 106 are stored in RAM 105 in a conventional manner. Data storage 107 stores data for use by the computer, including data objects 110 organized according to the code point structure of the present invention, as described more fully below. Some of the data may be stored on disk or other media (not shown), and may be swapped into RAM 105 as needed, according to conventional means. Code point library 108 contains the software routines for accessing data storage 107, including navigation through the data structure, interfacing, and indexing. Code point library 108 contains instructions for processor 102 for reading and modifying record lengths, and for performing operations on the stored data as described below. In response to calls from application programs 106, code point library 108 contains instructions for processor 102 to return record information and update the stored data accordingly.

Lookup tables 109 provide definitions for various code points, so that application programs 106 can interpret the data stored in data storage 107. A separate lookup table 109 may be provided by each application program 106, so that the application program 106 need only be concerned with a particular subset of the code point definitions.

Hierarchical Data

Figure 6:
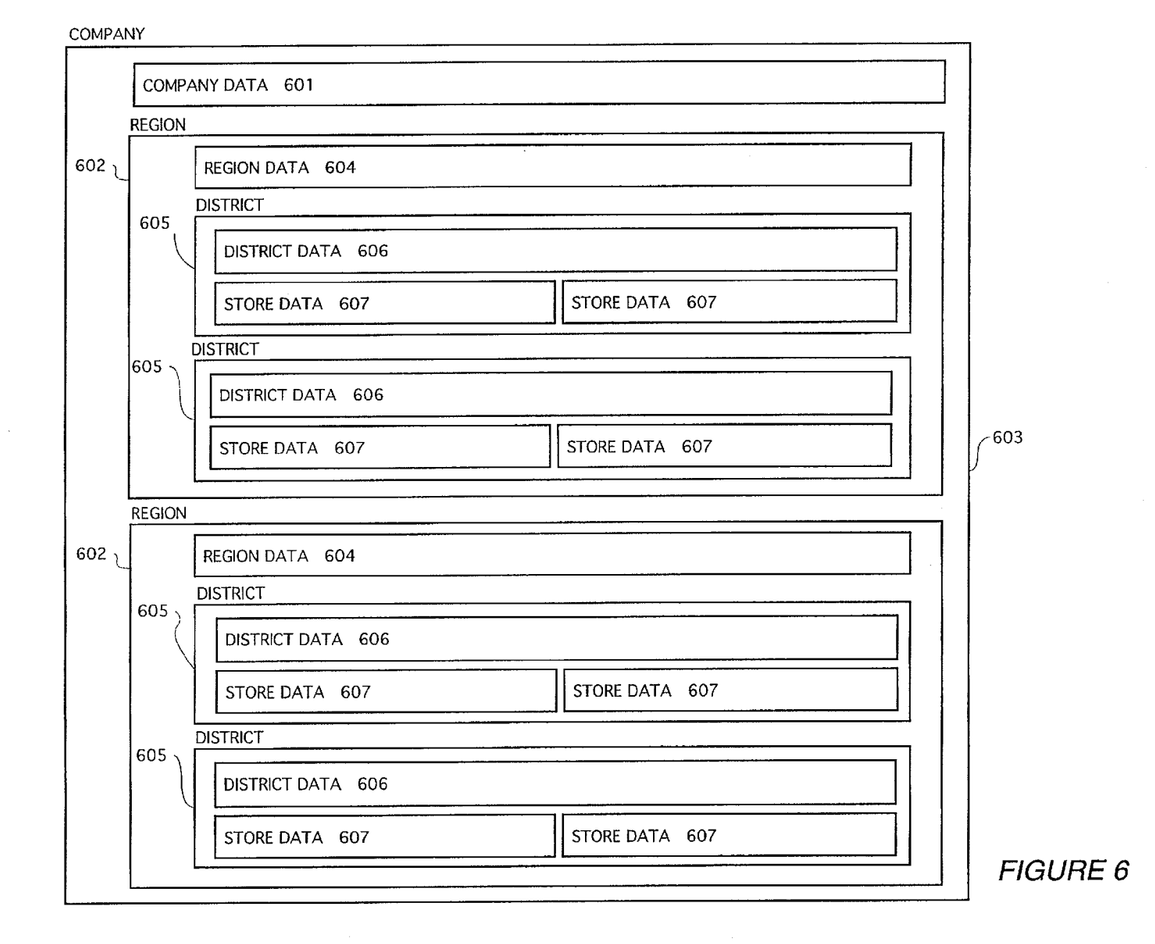
FIG. 6 is a diagram showing an example of a hierarchically-arranged collection of data fields suitable for storage according to the present invention.

Referring now to FIG. 6, there is shown an example of a hierarchically-arranged collection of data records suitable for storage according to the techniques of the present invention. For purposes of illustration, COMPANY record 600 is shown containing several records of information. All of the records contained within COMPANY record 600 relate to a single company. As can be seen, the records contained within COMPANY record 600 are arranged in a hierarchical structure.

Specifically, COMPANY record 600 contains one COMPANY DATA record 601 and two REGION records 602. COMPANY DATA record 601 describes the company as a whole, while REGION records 602 each describe a region associated with the company. Each REGION record 602 is further subdivided into a REGION DATA record 604 and two DISTRICT records 605. Each REGION DATA record 604 describes the region as a whole, while DISTRICT records 605 each describe a district associated with the region. Each DISTRICT record 605 is further subdivided into a DISTRICT DATA record 606 and two STORE DATA records 607. Each DISTRICT DATA record 606 describes the district as a whole, while STORE DATA records 607 each describe a store associated with the district.

Thus, a hierarchical structure emerges. Each individual record contained within COMPANY record 600 may be classified as either a container record or a data-containing record. Container records contain other records, while data-containing records contain data. No record is both a container record and a data-containing record. Record 600 is a container record, as are REGION records 602 and DISTRICT records 605. COMPANY DATA record 601 is a data-containing record, as are REGION DATA records 604, DISTRICT DATA records 606, and STORE DATA records 607. Thus, it can be seen that the container records serve to define and maintain the hierarchical relationship among the data-containing records.

Implicit in the hierarchical structure shown in FIG. 6 is a series of nested "levels" of data. COMPANY record 600 is a Level 0 record, since no records contain it. In all code point structures according to the preferred embodiment, the first record, typically designated as Level 0, is always a container record. COMPANY DATA record 601 and REGION records 602 are Level 1 records, since they are each contained by one record. REGION DATA records 604 and DISTRICT records 605 are Level 2 records, since they are each contained by two records. DISTRICT DATA records 606 and STORE DATA records 607 are Level 3 records, since they are each contained by three records.

Figure 7:
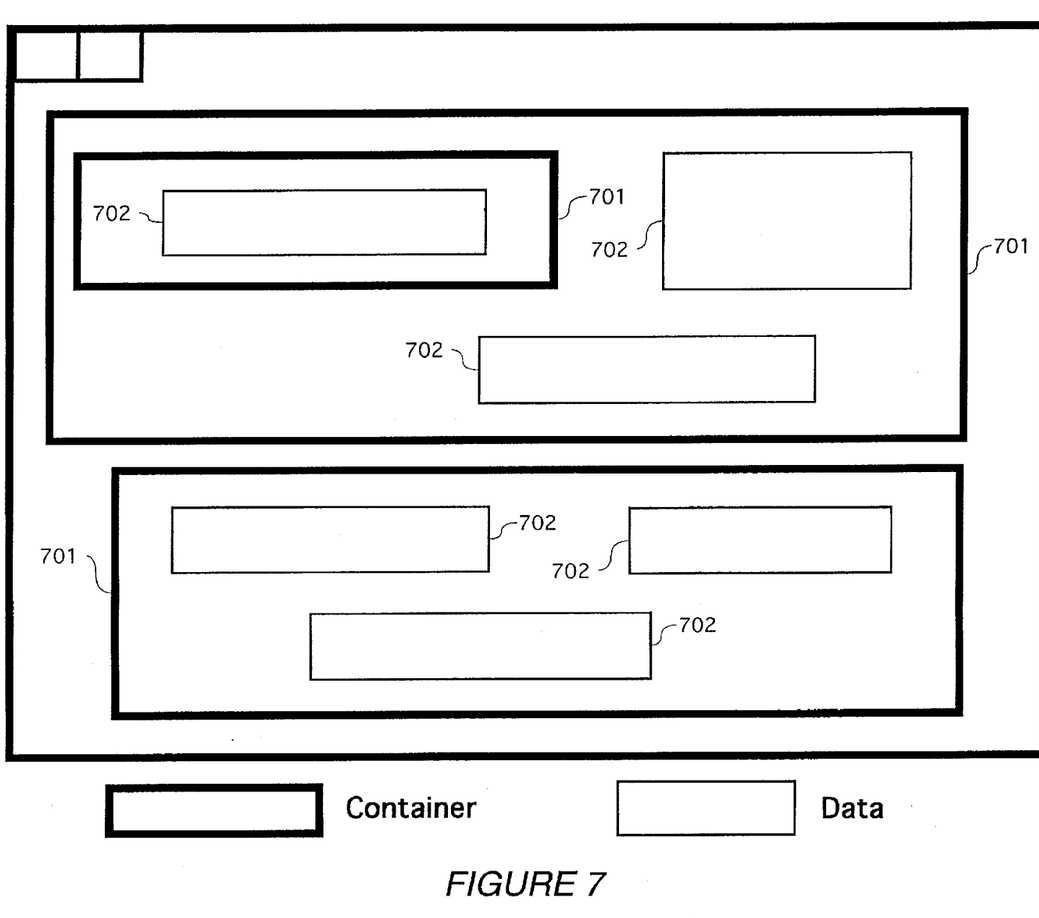
FIG. 7 is a diagram showing an example of a hierarchical relationship among data fields.

Referring now to FIG. 7, there is shown another example of a hierarchical relationship among records. Record 700 contains several hierarchically-organized records. Container records 701 contain other records, while data-containing records 702 contain data.

Overall Data Structure

The system and method of the present invention provide techniques of efficient storage and transmission of hierarchically-organized data of the type exemplified by FIGS. 6 and 7.

The following table is a representation of an example of a portion of memory that is organized according to the hierarchical code point structure of the present invention. Each record in the table corresponds to one of the records of the example of FIG. 6, described above.

| Memory location | Record Name | Length |
| --- | --- | --- |
| 1–6 | Company | 447 |
| 7–33 | Company Data | 27 |
| 34–39 | Region | 207 |
| 40–66 | Region Data | 27 |
| 67–72 | District | 87 |

-continued

| Memory location | Record Name | Length |
| --- | --- | --- |
| 73–99 | District Data | 27 |
| 100–126 | Store Data | 27 |
| 127–153 | Store Data | 27 |
| 154–159 | District | 87 |
| 160–186 | District Data | 27 |
| 187–213 | Store Data | 27 |
| 214–240 | Store Data | 27 |
| 241–246 | Region | 207 |
| 247–273 | Region Data | 27 |
| 274–279 | District | 87 |
| 280–306 | District Data | 27 |
| 307–333 | Store Data | 27 |
| 334–360 | Store Data | 27 |
| 361–366 | District | 87 |
| 367–393 | District Data | 27 |
| 394–420 | Store Data | 27 |
| 421–447 | Store Data | 27 |

The above table shows the contents of a contiguous block of memory that is 447 bytes long. For purposes of illustration, the first column of the table is indented according to the level of the record. Thus, the hierarchical relationship among the records is shown.

In the table, "Memory location" indicates the location of each record within the block of memory. In the interest of simplicity for this example, all container records occupy six bytes of memory and are shown in boldface. All data-containing records occupy 27 bytes of memory and are shown in a normal typeface. In the preferred embodiment, container records and data-containing records may vary in length, as will be described in more detail below.

For each record, there is a "Record Name" indicating the name of the corresponding record in FIG. 6. Each record also has a "Length" that indicates the total length of the record itself plus all records it contains. Thus, for example, the "Region" record that is stored at memory location 34–39 has a "Length" of 207, indicating that it contains all records residing at memory locations 34 through 240. In general, a record having a starting memory location of X and a "Length" of L contains all records residing at memory locations numbered X through X+L−1. By definition, a data-containing record has a "Length" equal to the actual length of the record itself, since a data-containing record cannot contain another record.

Thus, the placement of each record in memory, along with the "Length" values, define the hierarchical relationship among the records.

These hierarchical relationships permit rapid navigation through the data structure. If a long record is encountered that is of no interest to a particular process, the process can skip over the record (and any records nested within) by reading the "Length" and stepping forward by a number of bytes equal to the "Length". When stepping forward in this manner, the process need not read the skipped-over record into memory; only the "Length" of the first record need be read.

The hierarchical structure also permits creation of an object, or record, that contains information to be used by many different application programs 106 on the computer. Thus, for example, a level one record might represent an envelope to be handled by an electronic mail application, and might contain a number of level two records. Each level two record might be associated with a different application program 106, with the associations being defined by the code points. Each application program 106 need only be aware of the code point definitions for its associated records.

Finally, the hierarchical structure permits moving and copying of groups of nested records, or "chunks", at any level in the hierarchy. When performing an operation such as copying or moving a record, the system reads the length field and performs the operation on a continuous block of memory having the indicated length. Thus, in one operation, a record and all those records contained within it may be moved or copied.

Data Format for Records

Figure 2:
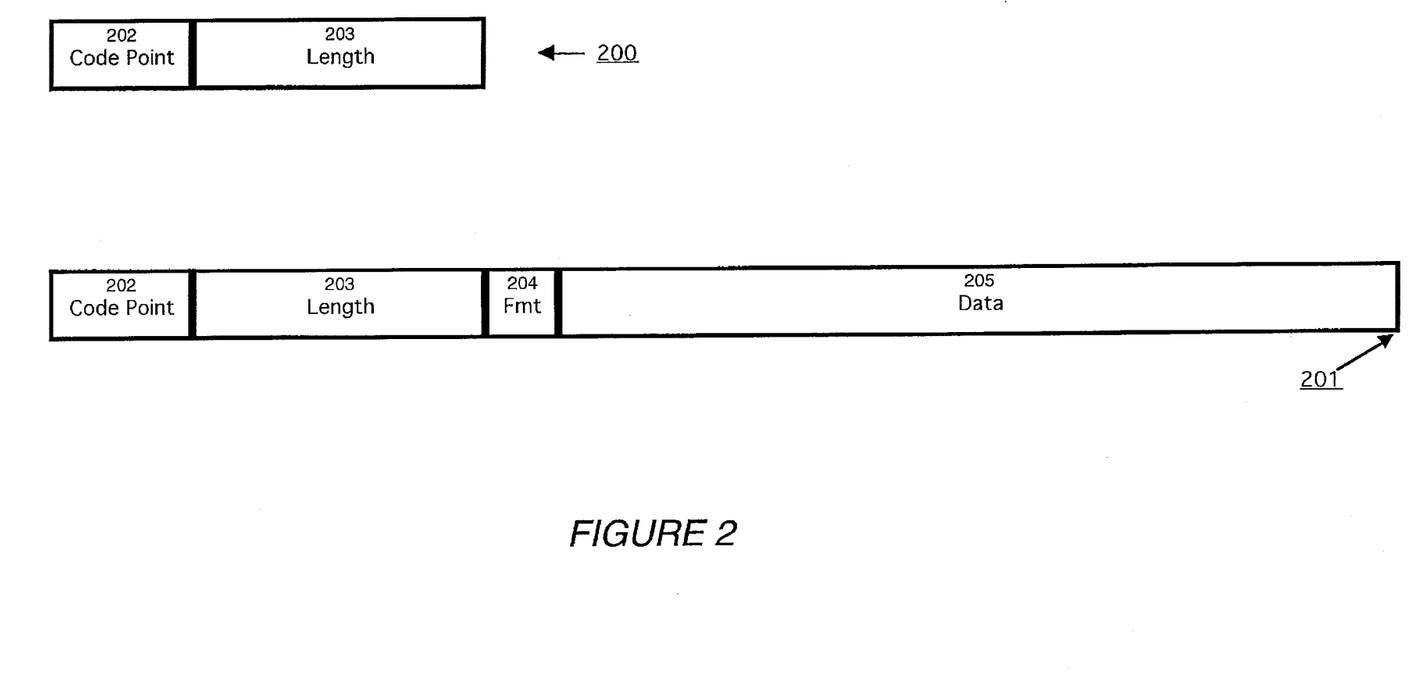
FIG. 2 is a diagram of the data formats used to store container records and data-containing records in the preferred embodiment.

Referring now to FIG. 2, there is shown a diagram of the data formats used to store container records and data-containing records in the preferred embodiment. Container record 200 includes two fields:

code point 202; and length 203.

Code point 202 is two bytes (16 bits) long. Three bits are used to specify the length of length field 203, which can vary from one (indicated by 001) to four bytes (indicated by 100). Eleven bits are used to specify a user-defined code that will be interpreted by the application program 106 making use of the invention. One bit is used to indicate that this is a container record (as opposed to a data-containing record). The final bit is free.

Length 203 is from one to four bytes long. The length of the length field 203 is determined by a portion of code point 202, as described in the previous paragraph. For container records, the length field 203 specifies the total length of all records that the current record contains (as described above). Providing variable length for this field increases the flexibility of the data format. Since the length field is up to four bytes long, the value of length 203 can range from zero to FFFFFFFF (hex).

Data-containing record 201 is similar to container record 200, except that it contains two additional fields:

format 204; and data 205.

Format 204 is a one-byte field that specifies an attribute type that is used by the application program 106 in interpreting the stored data. Thus, the system provides for automated translation of individual records from one data format to another. Required translation operations may be provided in the code point library.

Data 205 is a variable-length field that contains the stored data.

For data-containing records, the length field 203 specifies the length of the record itself, and therefore determines the length of data field 205. As stated above, the length of a data-containing record never extends beyond the end of the record itself. A data-containing record may have length of zero, so that it may be used as a flag.

Code Points

In the preferred embodiment, code points at various levels may be associated with different application programs 106. Thus, a typical level one record might consist of a data-containing record representing an outer envelope for an electronic mail message to be processed by an electronic mail application, while a series of level two records within the level one record might consist of additional container records, each identifying a particular application program 106 to be used to process the higher-level records within. Any records of level three or greater would be passed to the individual application programs 106 for further processing.

This technique permits the same code point to be reused at various levels of the data structure. For example, a code point of 5DF at level 3 can be distinguished from a code point of 5DF at level 4, because the code points will be interpreted by different applications.

In this way, the hierarchical structure provides a mechanism for defining a hierarchical relationship among various levels of data to be used by different applications.

Other embodiments, in which the various levels of code points and records are handled differently, may also be used without departing from the essential characteristics of the invention.

Referring now to FIG. 3, there is shown a sample string of 302 data bytes representing a series of hierarchically-organized records according to the present invention. Each byte is shown as a two-digit hexadecimal code 301, above which is shown the ASCII equivalent 302 for the byte. Each field is labeled to indicate its contents: "CP=CONT" is a container code point; "CP=DATA" is a data code point; "LEN" is a Length field; "FMT" is a Format field; and "DATA" is a data field. In the code points shown, the first byte is C0 for container records or 60 for data-containing records, while the second byte represents an application-defined code. Format 02 indicates ASCII data, while formats 04 and 05 indicate other types of data. FIG. 3 also includes horizontal lines 303 indicating the hierarchical relationships among the records.

Operations

Given the above data structure, the following operations are available:

Delete

Figure 4:
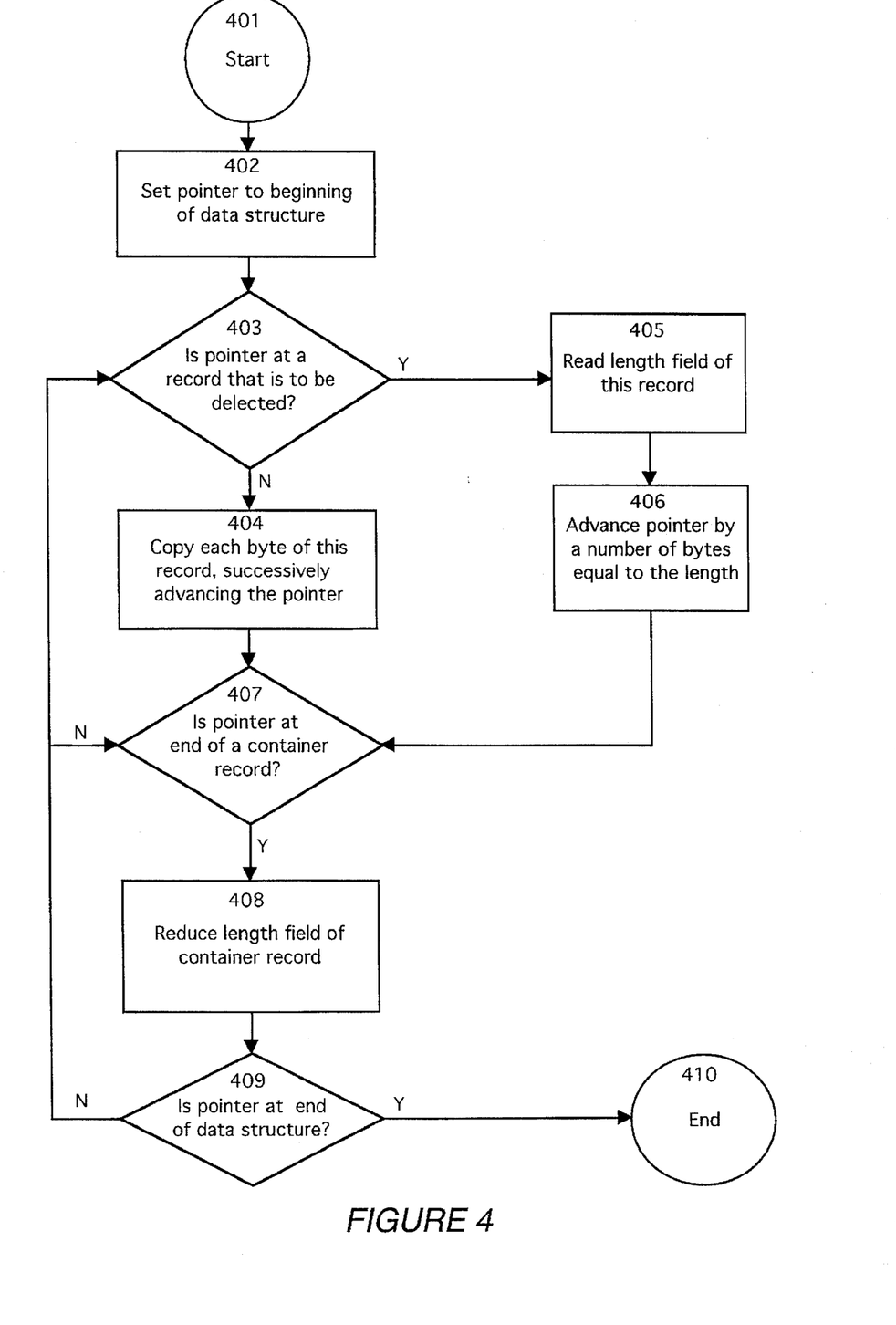
FIG. 4 is a flowchart showing the process of deleting a record.

Referring now to FIG. 4, the process of deleting a record is illustrated. To delete a record, including all the records it contains, the system rewrites the entire data structure, leaving out the records to be deleted. This is done by setting a pointer to the beginning of the data structure 402, and copying each byte of the data structure 404. Before copying each byte, the system checks 403 to see if the pointer is at a record that is to be deleted. If so, the system reads 405 the length field of the record and advances the pointer 406 by a number of bytes equal to the length of the record. After skipping forward, the system resumes copying successive bytes. Thus, the record and all the records it contains, are left out of the new data structure. When the system reaches the end of a container record 407, it reduces 408 the length field of the container record by an amount equal to the total length of all deleted records that were within the container record. The system keeps track of this total length in a stack called ICPI (Internal Code Points Information) (not shown). The system then checks 409 whether the end of the data structure was reached. If not, it repeats steps 403 through 409.

This process preserves the hierarchical relationships among surviving records when a record is deleted. For example, in FIG. 6, if one of the district records 605 were to be deleted (including all records contained therein), the length field of parent region record 602 would be reduced by 87 (the length of the deleted record). In turn, the length field of parent company record 600 would be reduced by 87. The length fields of all other records would remain unchanged, as no records within those records have been deleted.

Add

Figure 5:
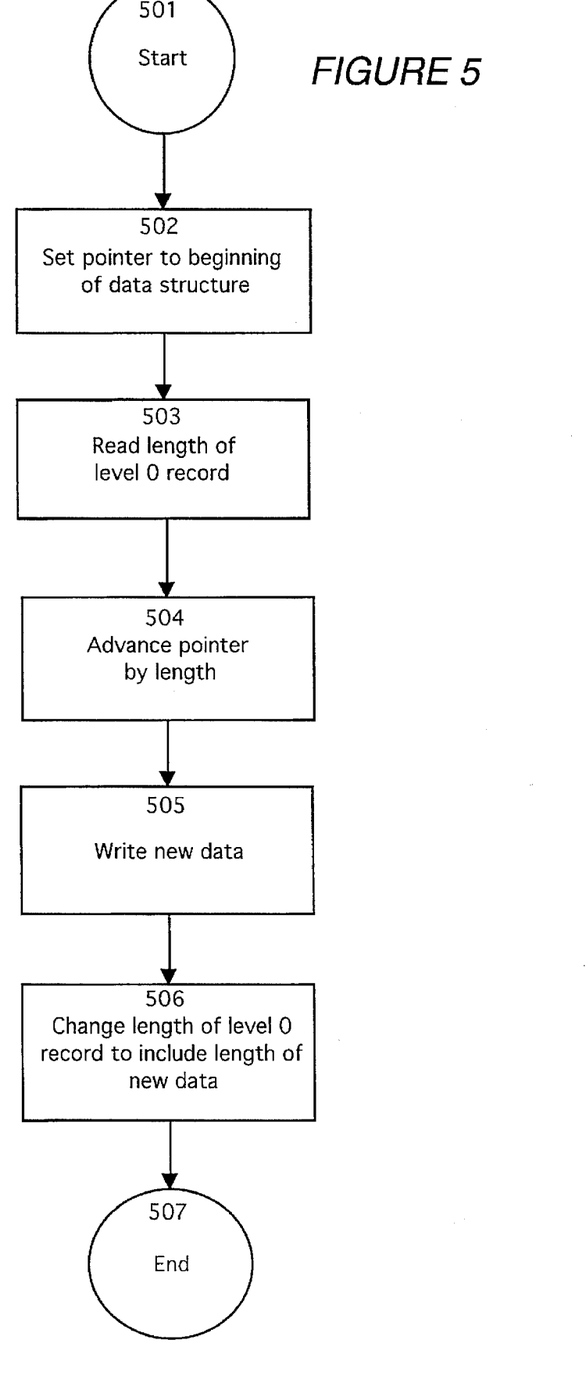
FIG. 5 is a flowchart showing the process of adding a record.

Referring now to FIG. 5, the process of adding a new record to the end of the data structure is illustrated. First the system sets the pointer 502 to the beginning of the data structure. Then it reads 503 the length of the first record in the structure, a level 0 record. The system then advances the pointer 504 by a number of bytes equal to the length. Thus, the pointer is positioned at the end of the data structure defined by the length of the first level 0 record. Once the pointer is at the end, the system writes 505 the new data starting at the pointer's location. As the new data is written, the system keeps track of the length of the written data, using temporary storage in the ICPI stack. After the new data is written, the length of the level 0 record is increased by the length of the newly written data 506. Thus, the level 0 record now contains the newly written data.

Although the above method was described in terms of adding data at level 1 of a data structure (so that level 0 contains the new data), the same technique could be used at any level. Once the new data is written, the system increases the value of the length records for all records containing the new data record.

Insert

Figure 8:
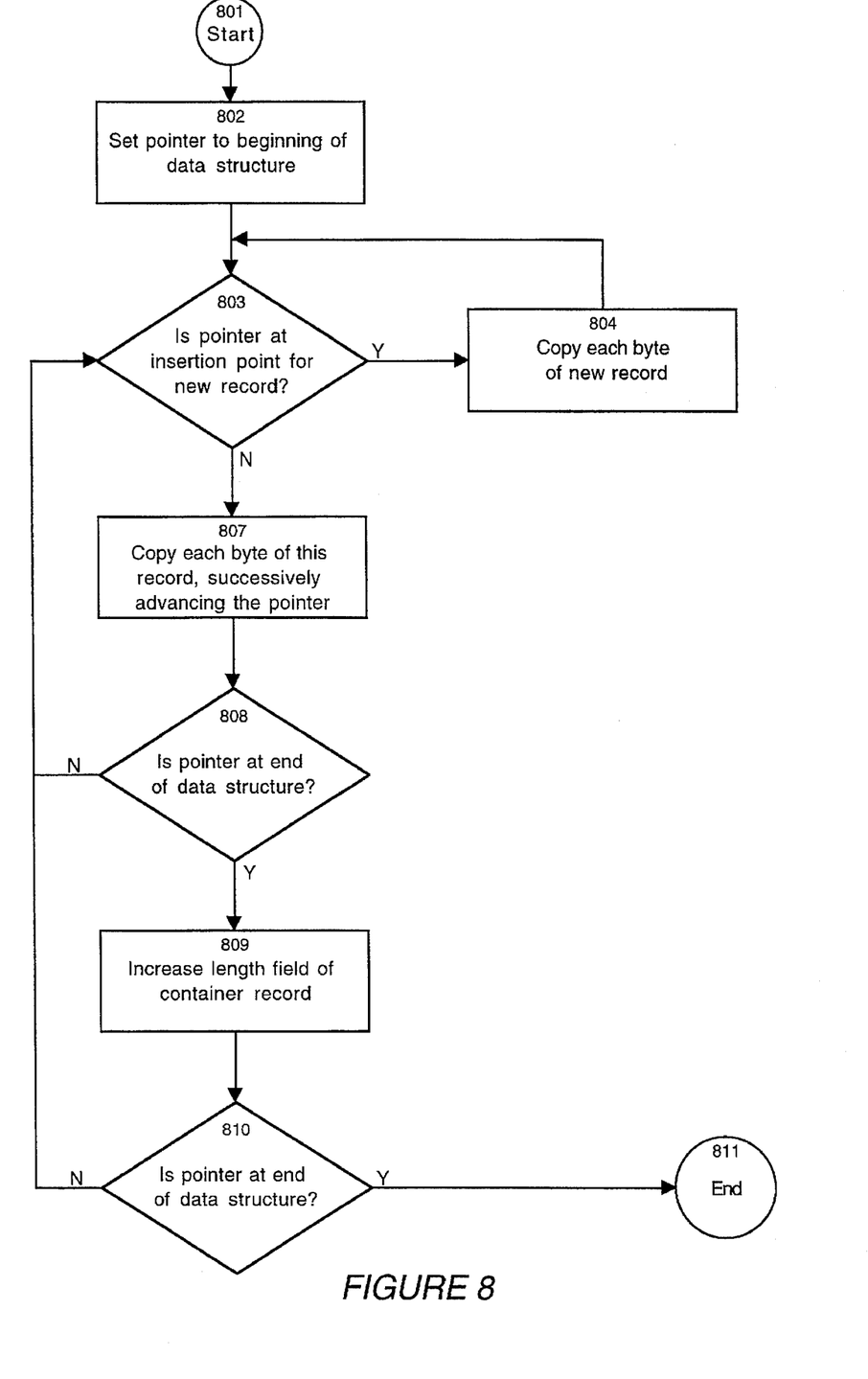
FIG. 8 is a flowchart showing the process of inserting a record.

Referring now to FIG. 8, the process of inserting a new record into the data structure is illustrated. To insert a record, the system rewrites the entire data structure, with the new record inserted. This is done by setting a pointer to the beginning of the data structure 802, and copying each byte of the data structure 807 while successively advancing the pointer. When the pointer reaches the point at which the new record is to be inserted 803, it copies the new record 804. The code point for the new record is copied from the code point of an adjacent record having the same level. Alternatively, a new code point may be specified by the application commanding the insertion operation. When the system reaches the end of a container record 808, it increases 809 the length field of the container record by an amount equal to the total length of all records that were inserted into the container record. The system keeps track of this total length in a stack called ICPI (Internal Code Points Information) (not shown). The system then checks 810 whether the end of the data structure was reached. If not, it repeats steps 803 through 809.

This process preserves the hierarchical relationships among records when a record is inserted. For example, in FIG. 6, if one of the district records 605 were to be deleted (including all records contained therein), the length field of parent region record 602 would be reduced by 87 (the length of the deleted record). In turn, the length field of parent company record 600 would be reduced by 87. The length fields of all other records would remain unchanged, as no records within those records have been deleted.

What is claimed is:

1. A computer readable memory having a plurality of storage locations for storing a plurality of records on the computer readable memory, comprising:

at least one hierarchical storage structure including at least one first container record, each first container record having a number of contiguous, first storage locations, selected one of the first storage locations forming:

a length field specifying a number of all storage locations of the first container record;

at least one data record each data record having a number of contiguous second storage locations at least one of the second storage locations forming a data field for storing data, and at least one of the second storage locations forming a length field specifying a number of contiguous second storage locations of the data record; and at least one second container record having a number of contiguous third storage locations forming a hierarchical structure of other container records and data records;

each record including a code point field specifying whether the record is a container record or a data record and specifying at least one of a plurality of application programs for processing the record.

2. The computer readable memory of claim 1, wherein the code point field further comprises a field indicating a length of the length field of the record.

3. The computer readable memory of claim 1 coupled to a processor for executing program instructions further comprising:

a plurality of application programs stored in the computer readable memory, each application program executable by the processor and having a table stored in the computer readable memory associating selected code points with selected application specific data types recognizable by the application program, wherein each application program manipulates a record retrieved from the storage area according to the code point included in the record.

4. The computer readable memory of claim 1, wherein each data record further comprises a format field specifying a data format for the data field.

5. A computer-implemented method of storing data in a hierarchical organization in a computer readable memory having a plurality of storage locations, comprising the steps of:

storing in a plurality of contiguous first storage locations at least one data record, at least one of the first storage locations forming a data field for storing data, and at least one of the first storage locations forming a length field specifying a number of contiguous first storage locations of the data record; and storing in a plurality of contiguous second storage locations at least one first container record, wherein the step of storing comprises the substeps of;

storing in selected ones of the second storage locations at least one data record; and storing in selected ones of the second storage locations at least one second container record; and storing in each record a length field specifying a number of all storage locations for the first container record and an application specific data type field.

6. The computer-implemented method of claim 5, wherein:

the step of storing in a plurality of contiguous second storage locations at least one first container record includes, for each first container record, storing a code point field specifying an application specific data type for the first container record; and the step of storing in a plurality of first contiguous storage locations at least one data record includes, for each data record, storing a code point field specifying an application specific data type for the data record, such that the code point field of each record is read by an application program receiving the record, the application program processing the record according to the code point.

7. The computer-implemented method of claim 5, wherein the step of storing at least one data record includes, for each data record, storing a format field specifying a data format for the data field.

8. A computer-implemented method of deleting a record in a hierarchical storage structure stored in a computer readable memory, the storage structure including a plurality of container records and a plurality of data records, each record including a length field specifying a number of storage locations for the record, and a code point field specifying whether the record is a container record or a data record and including an application specific data type field, each data record including a data field containing contiguously stored data, each container record including at least one data record stored contiguously therein, wherein the length field of a container record equals a total number of storage locations for all container records and data records included within the container record, the method comprising the steps of:

(a) designating a record to be deleted;

(b) setting an index to indicate a first storage location in the computer readable memory, of the data structure containing the record to be deleted;

(c) determining whether the index indicates the designated record;

(d) responsive to the index indicating the designated record, performing the substeps of:
  (d.1) reading the length field of the designated record; and
  (d.2) advancing the index by a number of storage locations equal to the length field;

(e) responsive to the index not indicating the designated record, performing the substeps of:
  (e.1) copying each storage location included in the record indicated by the index to a storage location in the computer readable memory; and,
  (e.2) advancing the index the end of the record;

(f) determining whether the index indicates the end of a container record including the designated record;

(g) responsive to the index indicating the end of a container record including the designated record, reducing the length field of the container record by an amount equal to the length field of the designated record;

(h) determining whether the index indicates the end of the data structure; and (i) responsive to the index not indicating the end of the data structure, repeating steps (c) through (h).

9. A computer-implemented method of adding a new record to a hierarchical storage structure stored in a computer readable memory, the storage structure including a plurality of container records and a plurality of data records, each record including a length field specifying a number of storage locations for the record, and a code point field specifying whether the record is a container record or a data record and including an application specific data type field, each data record including a data field containing contiguously stored data, each container record including at least one data record stored contiguously therein, wherein the length field of a container record equals a total number of storage locations for all container records and data records included within the container record, the method comprising the steps of:

(a) reading a length field of a first container record to which the new record is to be added;

(b) advancing an index by a number of storage locations equal to the length field;

(c) writing the new record at the storage location indicated by the index;

(d) writing in a length field for the new record a number of storage locations used to store the new record;

(e) increasing the length field o each container record including the new record by the number in length field of the new record.

10. A computer-implemented method of inserting a new record in a hierarchical storage structure stored in a computer readable memory, the storage structure including a plurality of container records and a plurality of data records, each record including a length field specifying a number of storage locations for the record, and a code point field specifying whether the record is a container record or a data record and including an application specific data type field, each data record including a data field containing contiguously stored data, each container record including at least one data record stored contiguously therein, wherein the length field of a container record equals a total number of storage locations for all container records and data records included within the container record, the method comprising the steps of:

(a) designating an insertion storage location within the data structure for the new record;

(b) setting an index to indicate a first storage location in the computer readable memory, of the data structure into which the new record is to be inserted;

(c) determining whether the index indicates the insertion storage location;

(d) responsive to the index indicating the insertion storage location, performing the substeps of:
  (d.1) copying the new record to a number of contiguous storage locations in the a computer readable memory; and
  (d.2) writing in a length field for the new record a number of storage cations used to store the new record;

(e) responsive to the index not indicating the insertion storage location, copying the record indicated by the index to a number of contiguous storage locations in the computer readable memory, and advancing the index to the end of the copied record;

(f) determining whether the index indicates the end of a container record including the new record;

(g) responsive to the index indicating the end of a container record including the new record, increasing the length field of the container record by an amount equal to the length field of the new record;

(h) determining whether the index indicates the end of the data structure; and (i) responsive to the index not indicating the end of the data structure, repeating steps (c) through (i).

11. A computer-implemented method of processing with a plurality of applications a record having a number of contiguous storage locations, selected ones of the storage locations forming a code point field and a length field specifying a number of storage locations of the record, the record being either a data record containing a data field for storing data or a container record hierarchically containing data records or other container records, the code point field of each data record and container record specifying an application specific data type and whether the record is a data record or a container record, the method comprising the steps of:

storing associations between a plurality of code points and a plurality of application specific data types in a memory device;

retrieving a first record from the computer readable memory;

determining from the code point stored in the first record the application specific data type of the record and whether the records is a container record or a data record; and processing the first record with an application program according to the data type associated with the code point.

12. The method of claim 11, wherein the step of processing the first record further comprises the steps of:

responsive to the first record being a container record containing at least one second record;

reading the at least one second record included in the first record;

determining the code point of each second record; and processing each second record with an application program according to the data type associated with the code point of each second record.

13. A computer readable memory having a plurality of storage locations for storing a plurality of records on the computer readable memory, comprising:

at least one hierarchical storage structure including:

at least one first container record, each first container record having a number of contiguous first storage locations, selected ones of the first storage locations forming:

a length field specifying a number of all first storage locations of the first container record; and at least one second container record having a number of contiguous second storage locations, selected ones of the second storage locations including:

a length field specifying a number of all second storage locations of the second container record; and at least one third container record having a number of contiguous third storage locations, selected ones of the third storage locations including either;

at least one further container record having a number of contiguous storage locations; or at least one data record, each data record having a number of contiguous fourth storage locations, at least one of the fourth storage locations forming a data field for storing data, and at least one of the fourth storage locations forming a length field specifying a number of contiguous fourth storage locations of the data record; and each record including a code point field specifying whether the record is a container record or a data record.

14. A computer readable memory having a plurality of storage locations for storing a plurality of records on the computer readable memory, comprising:

at least one hierarchical storage structure having a plurality of levels, each level capable of storing heterogeneous records including:

at least one data record, each data record having a number of contiguous first storage locations, at least one of the first storage locations forming a data field for storing data, and at least one of the first storage locations forming a length field specifying a number of contiguous first storage locations of the data record;

at least one container record, each container record having a number of contiguous second storage locations, selected ones of the second storage locations forming at least one further level of records, and at least one second storage location forming length field specifying a number of all storage locations of the second container record, including all storage locations in records in the at least one further level; and each record including a code point field specifying whether the record is a container record or a data record and specifying at least one of a plurality of application programs for processing the record.

* * * * *